United States Patent
Wang et al.

(10) Patent No.: US 8,990,208 B2
(45) Date of Patent: Mar. 24, 2015

(54) INFORMATION MANAGEMENT AND NETWORKING

(75) Inventors: Jun Wang, San Jose, CA (US); Kanji Uchino, San Jose, CA (US)

(73) Assignee: Fujitsu Limited, Kawasaki-shi (JP)

(*) Notice: Subject to any disclaimer, the term of this patent is extended or adjusted under 35 U.S.C. 154(b) by 115 days.

(21) Appl. No.: 13/240,913

(22) Filed: Sep. 22, 2011

(65) Prior Publication Data

US 2013/0080428 A1  Mar. 28, 2013

(51) Int. Cl.
*G06G 7/00* (2006.01)
*G06F 17/30* (2006.01)
*G06Q 10/10* (2012.01)
*G06Q 50/00* (2012.01)

(52) U.S. Cl.
CPC .......... *G06Q 10/10* (2013.01); *G06F 17/30867* (2013.01); *G06Q 50/01* (2013.01)
USPC .......................................... 707/737; 707/732

(58) Field of Classification Search
None
See application file for complete search history.

(56) References Cited

U.S. PATENT DOCUMENTS

| | | | | |
|---|---|---|---|---|
| 5,886,683 | A * | 3/1999 | Tognazzini et al. | 715/700 |
| 7,664,746 | B2 * | 2/2010 | Majumder | 707/732 |
| 2006/0048059 | A1 * | 3/2006 | Etkin | 715/745 |
| 2008/0040475 | A1 * | 2/2008 | Bosworth et al. | 709/224 |
| 2011/0060738 | A1 * | 3/2011 | Gates et al. | 707/737 |
| 2012/0066073 | A1 * | 3/2012 | Dilip et al. | 705/14.66 |
| 2012/0191715 | A1 * | 7/2012 | Ruffner et al. | 707/738 |

* cited by examiner

*Primary Examiner* — Taelor Kim
*Assistant Examiner* — David T Brooks
(74) *Attorney, Agent, or Firm* — Baker Botts L.L.P.

(57) ABSTRACT

In one embodiment, a personal information profile is constructed for a user having a collection of information items. The personal information profile comprises one or more information topics, and each information topic comprises one or more information items. Each information topic has an interesting score, which indicates a level of interest the user has in the information topic. In one embodiment, a social network is inferred among a group of users, each having a personal information profile. A connection exists between every two users that share at least one common-interest information topic, indicated by their respective personal information profiles.

41 Claims, 7 Drawing Sheets

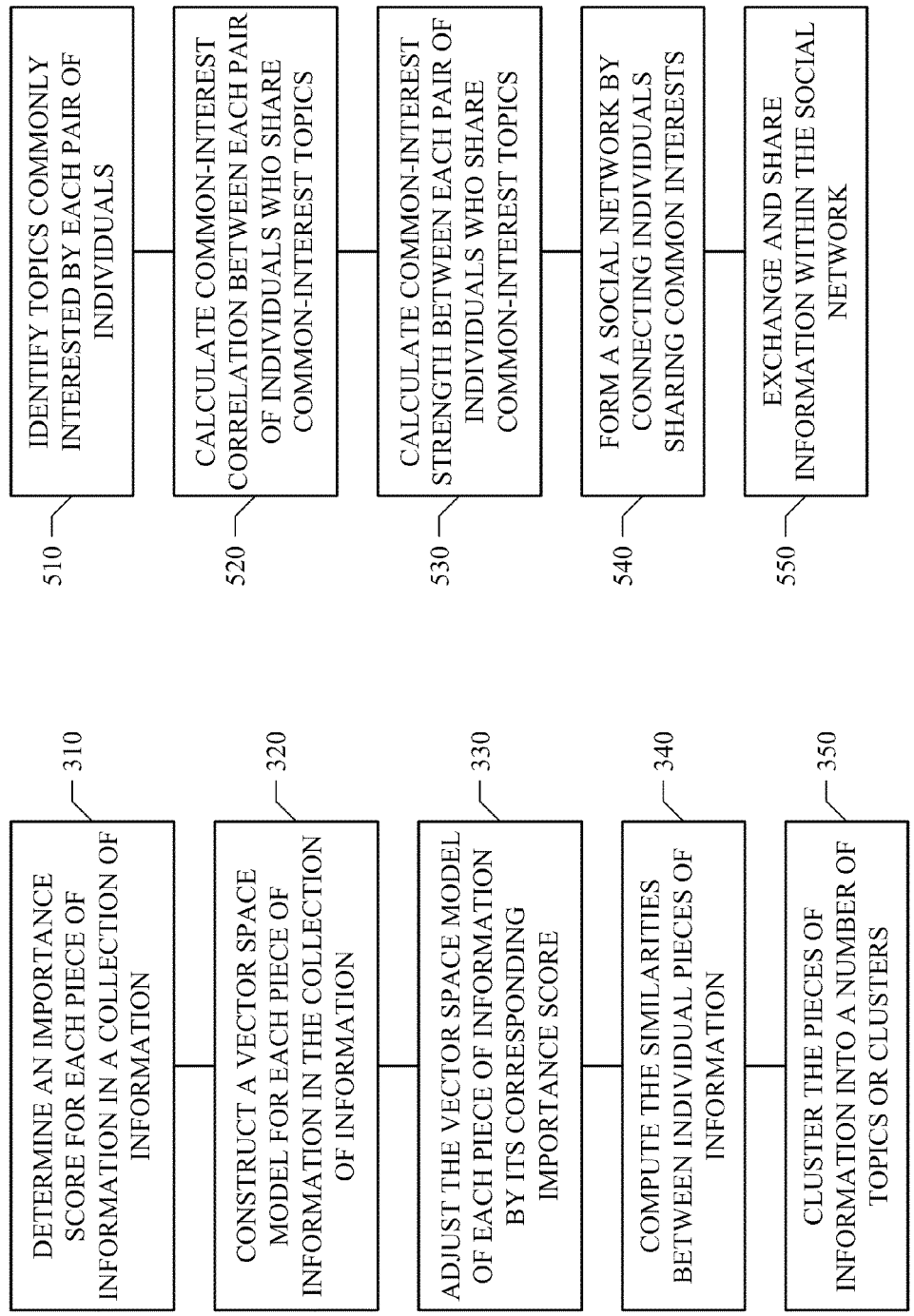

INFORMATION MANAGEMENT AND NETWORKING

TECHNICAL FIELD

This disclosure generally relates to information management and information-based social network.

BACKGROUND

In this information age, there is an overwhelming amount of information readily available and accessible partly due to the ability of individuals to disseminate information freely, quickly, and easily. Often, people may be interested in and collect specific pieces of information. It is not unusual that over time, a person may collect a large amount of information such that it becomes difficult for the person to manage all the information he has collected and continues to collect.

BRIEF DESCRIPTION OF THE DRAWINGS

FIG. 3 illustrates an example method for clustering a person's collection of information into a number of topics.

FIG. 5 illustrates an example method for inferring an information-based social network among a group of people.

DESCRIPTION OF EXAMPLE EMBODIMENTS

There is an overwhelming amount of information available and accessible both online and offline. The information relates to various subject matters or topics and is organized in various structures, stored in various mediums, and presented in various formats. Depending on their needs or objectives, people may be interested in and collect specific pieces of information, also referred to as "information items". This is especially true for people working in certain fields, such as researchers, developers, writers, etc. Such people may be referred to as "knowledge workers". A knowledge worker is any person who interacts (e.g., review, disseminate, collect, create, publish, etc.) with information on a relatively regular basis.

Sometimes, a person, such as a knowledge worker, may wish to maintain a personal collection of specific information items. The information in a person's own collection may be especially interesting or useful to that person (e.g., information relating to a project that the person is working on or has worked on) so that the person may wish to be able to quickly and easily locate and retrieve specific information items in the collection whenever needed. However, over time, a person may gradually collect a large amount of information for his or her own information collection so that it becomes difficult to locate specific information items in the collection.

Particular embodiments manage the personal collections of information associated with individual persons, such as individual knowledge workers. For each person having a personal collection of information, an information profile is constructed that indicates, for example and without limitation, which subject matters, fields, or topics the person is interested in, what types or specific information items are relatively more important to the person and what types or specific information items are relatively less important to the person, which specific information items are similar or related to each other, etc. The individual information items in the collection may be ranked and filtered, and presented to the corresponding person in a way that is easy for the person to view the collection and locate specific information items in the collection.

In addition, particular embodiments establish an information-based social network among the people having personal collections of information. A social connection may exist between every two people who collect some of the same or similar information items. Moreover, the more information items commonly collected by two people, the stronger the social connection between them, and vice versa.

Figures 1, 2:
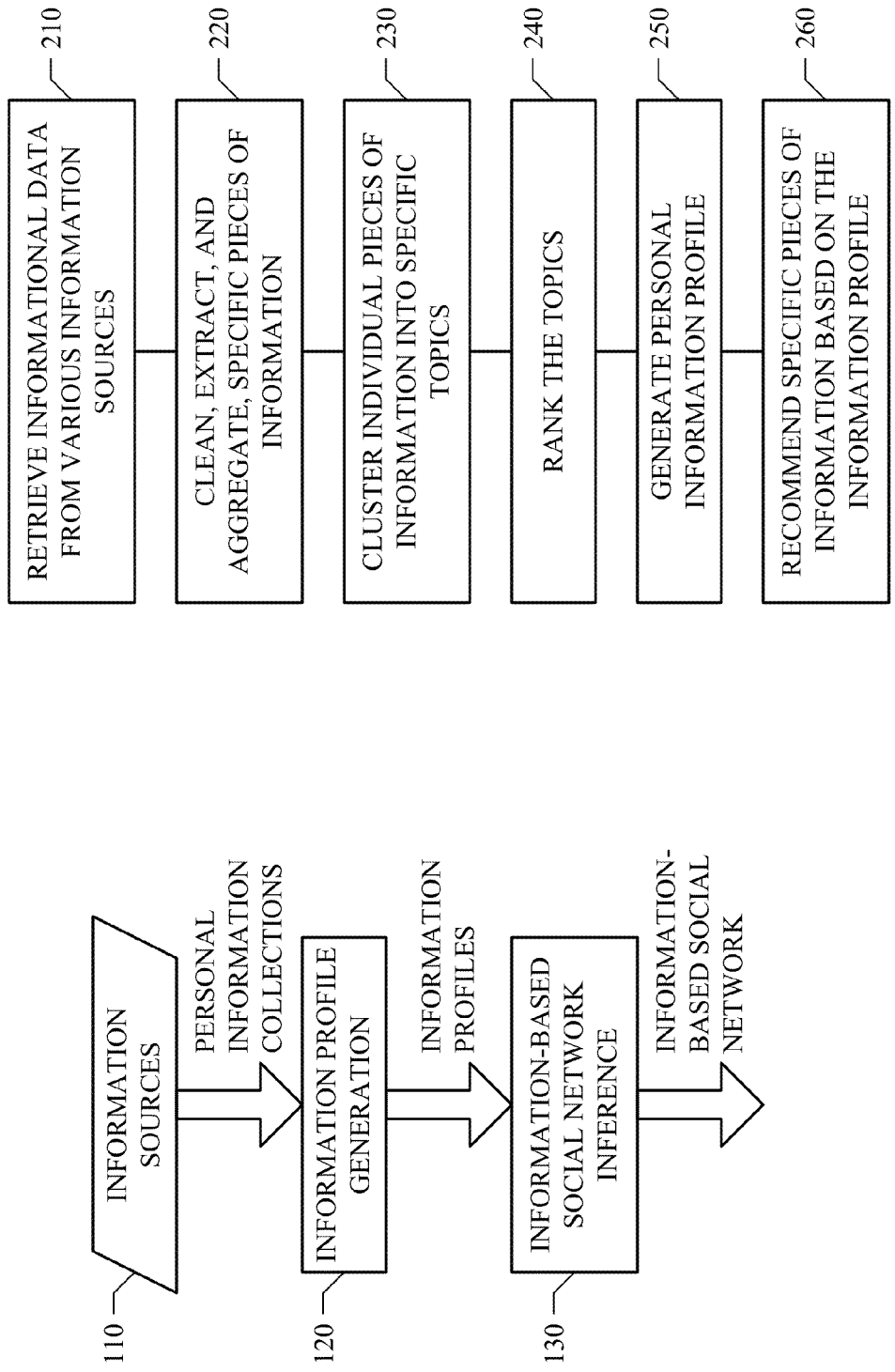
FIG. 1 illustrates an example system for managing information collections and information-based social networks.
FIG. 2 illustrates an example method for generating an information profile for a person.

FIG. 1 illustrates an example system for managing information collections and information-based social networks. In particular embodiments, information collected by individual persons, such as knowledge workers, may come from a variety of information sources 110, online (e.g., digital data) or offline (e.g., books, papers, etc.), public (e.g., information available on the Internet) or private (e.g., information available on an intranet inside the firewall of an organization, institution, or business). For example and without limitation, the types of information sources 110 may include websites (e.g., content included in web pages or posts), databases (e.g., documents or files stored therein), emails, short messages, data feeds, enterprise information (e.g., information belonging to an organization, institution, or business), etc. This disclosure contemplates any applicable types of information sources.

Each person may have his or her own personal collection of information. Given a specific person, "X", there may be any number of information items from any number of information sources 110 in X's personal information collection. These information items may be created by X himself or herself (e.g., X is the author of the information) or by other people. Furthermore, these information items may be explicitly identified by X himself or herself or implicitly inferred as being relevant to X. For example, X may bookmark a web page (e.g., one that includes certain content that X is interested), follow an online discussion (e.g., messages or tweets on a specific topic), post an article, or send an email. The web page, messages, article, or email may be included in X's personal information collection based on X's explicit actions. As another example, X may visit websites (e.g., as indicated by server logs) or receive emails, data feeds (e.g., web, news, RSS, etc.), or short messages, which may be included in X's personal information collection because they are considered relevant to X. In particular embodiments, a person's personal collection of information may reflect that person's activities (e.g., online activities), interests (e.g., professional or personal), preferences, etc.

In particular embodiments, an information profile is automatically generated 120 for each person. Given a specific person, "X", the information profile generated for X represents X's personal information collection, such as, for example and without limitation, what types or specific information items are included in X's personal information collection, their degrees of importance to X, their degrees of similarity or dissimilarity to each other, etc.

In particular embodiments, an information-based social network is automatically inferred 130 among a group of people each having a personal collection of information. The social network may be inferred based on the information profiles associated with the individuals. A social connection may exist between two people who have one or more same or similar information items in their respective personal information collections. Moreover, the more same or similar information items two people have in their respective personal information collections, the stronger the social connection between them, and vice versa Information profile generation 120 and information-based social network inference 130 may each be implemented as computer software, hardware, or a combination thereof, and may each include any number of modules or components implementing various functionalities. A person (e.g., X) whose information profile is automatically generated by a computer-implemented system may also be referred to as a "user" of the system. Thus, an information-based social network may be inferred among a group of users, each having his or her personal information profile.

FIG. 2 illustrates an example method for automatically generating an information profile for a person. Note that the steps in FIG. 2 may be similarly applied to multiple people to generate a different information profile for each person. Given a specific person, "X", there may be various types or pieces of information that are considered relevant or personal to X. The information may be from various information sources (e.g., the Internet, an intranet, servers, databases, etc.) and have various forms (e.g., web pages, emails, short messages, posts, etc.). What specific information is considered relevant or personal to a person (e.g., X) may depend on various factors, such as, for example and without limitation, the person's own actions that explicitly indicate that he or she is interested in the specific information, or the nature or characteristics of the specific information that implicitly suggest that the information is relevant to the person.

Particular embodiments may retrieve the data representing the specific information that is considered relevant or personal to X from various applicable information sources, as illustrated in STEP 210. There may be different ways to retrieve different types of informational data. For example, a web crawler, implemented as computer software, may crawl the Internet or an intranet to retrieve all the web pages bookmarked or recently visited by X. X's emails (e.g., sent by or sent to X) may be retrieved from each of X's email accounts. X's short messages may be retrieve from X's mobile telephone. X's online posts may be retrieved from each of X's online accounts.

Particular embodiments may clean the retrieved informational data, extract specific information items from the retrieved informational data, and aggregate certain information items, as illustrated in STEP 220. In particular embodiments, each piece of information is a collection of text (e.g., a document), which may include any number of terms. Each term may include any number of words. Sometimes, there may be noise or irrelevant data in the retrieved informational data. Such noise may be removed and discarded when the retrieved informational data are cleaned so that only the relevant content is extracted. For example, a web page may include an advertisement in addition to its main content. The advertisement may be removed and discarded when the web page is cleaned and only the main content of the web page is extracted.

Particular embodiments may index the individual terms in each collection of text (e.g., document). The indexing may be used for searching specific terms in the documents. For example, the terms in the documents may be indexed using inverted indexing. This disclosure contemplates any applicable indexing algorithm. In addition, particular embodiments may extract and analyze the meta data (e.g., title, tags, timestamp, geo-location, etc.) associated with each document.

Given a collection of information (e.g., a collection of documents) thus obtained for X, particular embodiments may cluster the individual information items into specific topics or information clusters. FIG. 3 illustrates an example method for automatically clustering a person's (e.g., X's) collection of information into a number of information topics or clusters. There may be any number of information items in X's personal information collection, and they may be clustered into any number of information topics or clusters. In particular embodiments, each piece of information may be a collection of text, which may be represented as a document. Each document may contain any number of terms, and each term may include any number of words.

Suppose that there is a total of N documents in X's information collection. Particular embodiments may determine an importance score, iScore, for each document, d, in the collection, as illustrated in STEP 310. The importance score of a document may indicate the degree of importance the content of that document is to X. The importance score of each document may be determined based on various factors, such as, for example and without limitation, its content, source, type, recency, authorship, or degree of dissemination. This disclosure contemplates any applicable factor. X may also provide default score values (e.g., for documents of a specific type or from a specific source). For example, X may specify that documents retrieved from one particular information source should receive relatively higher importance scores because this information source is known to provide accurate and reliable information or information X is particularly interested in. On the other hand, documents retrieved from another information source should receive relatively lower importance scores because this second information source often provides inaccurate information or information X is not especially interested in. As another example, newer information may receive higher importance scores than older information as it is more up-to-date. As a third example, certain types of information (e.g., personal emails or messages sent to X or RSS feeds subscribed by X) may receive higher importance scores than other types of information (e.g., web pages downloaded from the Internet).

To further explain the computation of importance scores for the individual documents, consider the following two examples. First, suppose that there are a number of emails retrieved from X's email accounts, which are included in X's information collection. In some implementations, emails that belong to a conversation (e.g., a series of emails sent back and forth between X and one or more other people) may receive higher importance scores than emails not engaged in any conversation. In some implementations, the importance score of each email belonging to a particular conversion may be computed as:

$$iScore^{email\_in\_conversaion} = f^w \times \left(1 + \log\left(\frac{N^{conversaion}}{M}\right)\right), \quad (1)$$

where: $f^w$ is a default weight factor assigned to emails (e.g., by X); $N^{conversation}$ is the total number of emails in the particular conversion; and M is a predetermined constant (e.g., set by X).

Second, suppose that there are a number of online contents (e.g., web pages, posts, etc.) retrieved from various websites on the Internet, which are included in X's information collection. In some implementations, contents created by X himself or herself may be more important than contents created by other people. Contents bookmarked by X may be more important than contents merely viewed (e.g., clicked on, but not bookmarked) by X. Contents from mainstream media may be more important than contents from personal blogs or forums. In some implementations, the final importance score of each online content may depend on several intermediate importance scores, such as a source importance score, $\text{iScore}^{source}$, which indicates the importance, to X, of the information source from where the content is retrieved, a type importance score, $\text{iScore}^{type}$, which indicates the importance, to X, of the type of the content, and a volume importance score, $\text{iScore}^{volume}$, which indicates the amount of contents retrieved from the same information source. The importance score of each online content may be computed as:

$$\text{iScore}^{content} = \text{iScore}^{source} \times \text{iScore}^{type} \times \text{iScore}^{volume}, \qquad (2A)$$

and the volume importance score may be computed as:

$$\text{iScore}^{volume} = 1 + \log\frac{volume}{K}, \qquad (2B)$$

where: volume is the total number of contents retrieved from the same information source from which this content is also retrieved; and K is a constant used to adjust the volume importance score when needed.

Particular embodiments may construct a vector space model (VSM), $\vec{V}$, for each document, d, in X's information collection, as illustrated in STEP 320. A vector space model, also referred to as term vector model, is an algebraic model for representing objects, such as text documents, as vectors of identifiers, such as index terms. It is often used for information filtering, retrieval, indexing, or relevancy ranking. In particular embodiments, each piece of information in X's information collection may be represented as a document containing any number of unique terms. Note that a particular term may appear in the same document any number of times. In some implementations, the vector space model of each document may be defined as:

$$\vec{V} = ((t_1, w_1), (t_2, w_2), \ldots, (t_n, w_n)), \qquad (3A)$$

where: each $t_i$ is a unique term found in this document (i.e., the current document for which the vector space model is constructed); $w_i$ is a weight associated with $t_i$; and n is the total number of unique terms found in this document (i.e., $1 \leq i \leq n$). The weight associated with each term may be computed as:

$$w = f^t \times \log_2\left(\frac{N}{f^d}\right), \qquad (3B)$$

where: N is the total number of documents in X's information collection; $f^t$, referred to as "term frequency", is the total number of times the associated term is found in this document (i.e., the current document for which the vector space model is constructed); and $f^d$, referred to as "document frequency", is the total number of documents in X's information collection that contain the associated term.

Particular embodiments may adjust the vector space model of each document, d, in X's information collection based on the importance score of that document, as illustrated in STEP 330. In some implementations, the vector space model of each document may be adjusted as:

$$\vec{V}' = ((t_1, w'_1), (t_2, w'_2), \ldots, (t_n, w'_n)) \qquad (4A)$$
$$= \text{iScore} \times \vec{V}$$
$$= \text{iScore} \times ((t_1, w_1), (t_2, w_2), \ldots, (t_n, w_n)),$$

where: $\vec{V}'$ is the adjusted vector space model of this document; each $t_i$ is a unique term found in this document; $w'_i$ is the adjusted weight associated with $t_i$ (e.g., $w'_i = \text{iScore} \times w_i$); and n is the total number of unique terms found in this document.

Particular embodiments may compute a degree of similarity between every two documents in X's information collection using their respective adjusted vector space models, as illustrated in STEP 340. In some implementations, given two documents, $d_1$ and $d_2$, having adjusted vector space models, $\vec{V}'_1$ and $\vec{V}'_2$, respectively, the degree of similarity between the two documents may be computed as:

$$\cos(\vec{V}'_1, \vec{V}'_2) = \frac{\vec{V}'_1 \cdot \vec{V}'_2}{|\vec{V}'_1||\vec{V}'_2|} = \frac{\sum_{i=1}^{i \leq n1} w'_i \times \sum_{j=1}^{j \leq n2} w'_j}{\sqrt{\sum_{i=1}^{i \leq n1} w'^2_i} \times \sqrt{\sum_{j=1}^{j \leq n2} w'^2_j}}, \qquad (4B)$$

where: n1 and n2 are the total numbers of unique terms in $d_1$ and $d_2$, respectively; each $w'_i$ is an adjusted weight from $\vec{V}'_1$; and each $w'_j$ is an adjusted weight from $\vec{V}'_2$.

Particular embodiments may cluster the documents in X's information collection into a number of topics based on their respective similarity degrees, as illustrated in STEP 350. Each topic may be a particular subject matter. For example, one topic may relate to sports, another topic may relate to travel, and a third topic may relate to computer programming. Similar documents, as indicated by their similarity values, may be assigned to the same topic. In some implementations, a similarity threshold may be used, such that when the similarity value (e.g., as computed using EQUATION (4B)) between two documents is above the similarity threshold, the two documents are assigned to the same topic; otherwise, they are assigned to different topics. The similarity threshold may be selected to control the granularity of the clustering. For example, all documents relating to sports may be assigned to a single topic. Alternatively, documents relating to team sports (e.g., baseball, basketball, football, etc.) may be assigned to one topic; while documents relating to individual sports (e.g., tennis, golf, boxing, etc.) may be assigned to another topic. Alternatively, documents relating to each type of sport may be assigned to a separate topic. Typically, higher similarity threshold may result in more granular clustering; while lower similarity threshold may result in less granular clustering.

Particular embodiments may determine a centroid and one or more keywords for each topic or cluster. Given a specific topic or cluster, its centroid may be used to represent all the documents in the cluster, and its keywords describe the content of the documents in the cluster. In the context of cluster analysis or clustering, the centroid of a cluster of documents is the center or average of the documents in the cluster.

Particular embodiments may rank the topics, as illustrated in STEP 240. The ranking may be based on X's personal interests, such that those topics that X is more interested in are ranked higher than those topics that X is less interested in. Particular embodiments may determine a ranking score, rScore, for each topic, T, that has been discovered during the clustering of the documents. The ranking score of a specific topic measures X's personal interest in that topic based on both the content and the time of that topic, as a person's personal interests often change over time. Thus, the ranking score may also be referred to as "interesting score", as the ranking score of a specific topic measures the level or intensity of interest X has in that topic.

In some implementations, the ranking score of each topic may be defined as:

$$rScore = \frac{\sum_{j=1}^{j \leq N} e^{-\lambda(t-t_j)}}{\sum_{i=1}^{i \leq M} \sum_{j=1}^{j \leq N} e^{-\lambda(t-t_j)}}, \quad (5)$$

where: $\lambda$ is a constant factor for adjusting the impact of time; M is the total number of topics or clusters; N is the total number of documents in this topic or cluster (i.e., the current topic or cluster for which the ranking score is computed); t is the current time; and $t_j$ is the time of document j in this topic or cluster (e.g., the time document j in this topic or cluster is created or bookmarked).

Particular embodiments may rank the topics or clusters base on their respective ranking scores, such that those topics having relatively higher ranking scores are ranked higher than those topics having relatively lower ranking scores. A personal information profile may be generated for X based on the ranked topics, as illustrated in STEP 250. The topics may then be presented to X based on their ranking scores. In some implementations, the topics may be visually distinguished (e.g., using color, size, font, graphics, placement, position, etc.) so that it is easy and intuitive for X to recognize which topics are more interesting and which are less interesting to X. For example, if the topics are presented in a ranked list, then those topics that are ranked higher may be presented before those topics that are ranked lower. If colors are used to distinguish the topics, then those topics that are ranked higher may be presented using darker colors and those topics that are ranked lower may be presented using lighter colors. If sizes are used to distinguish the topics, then those topics that are ranked higher may be presented in larger sizes and those topics that are ranked lower may be presented in smaller sizes.

Figure 4:
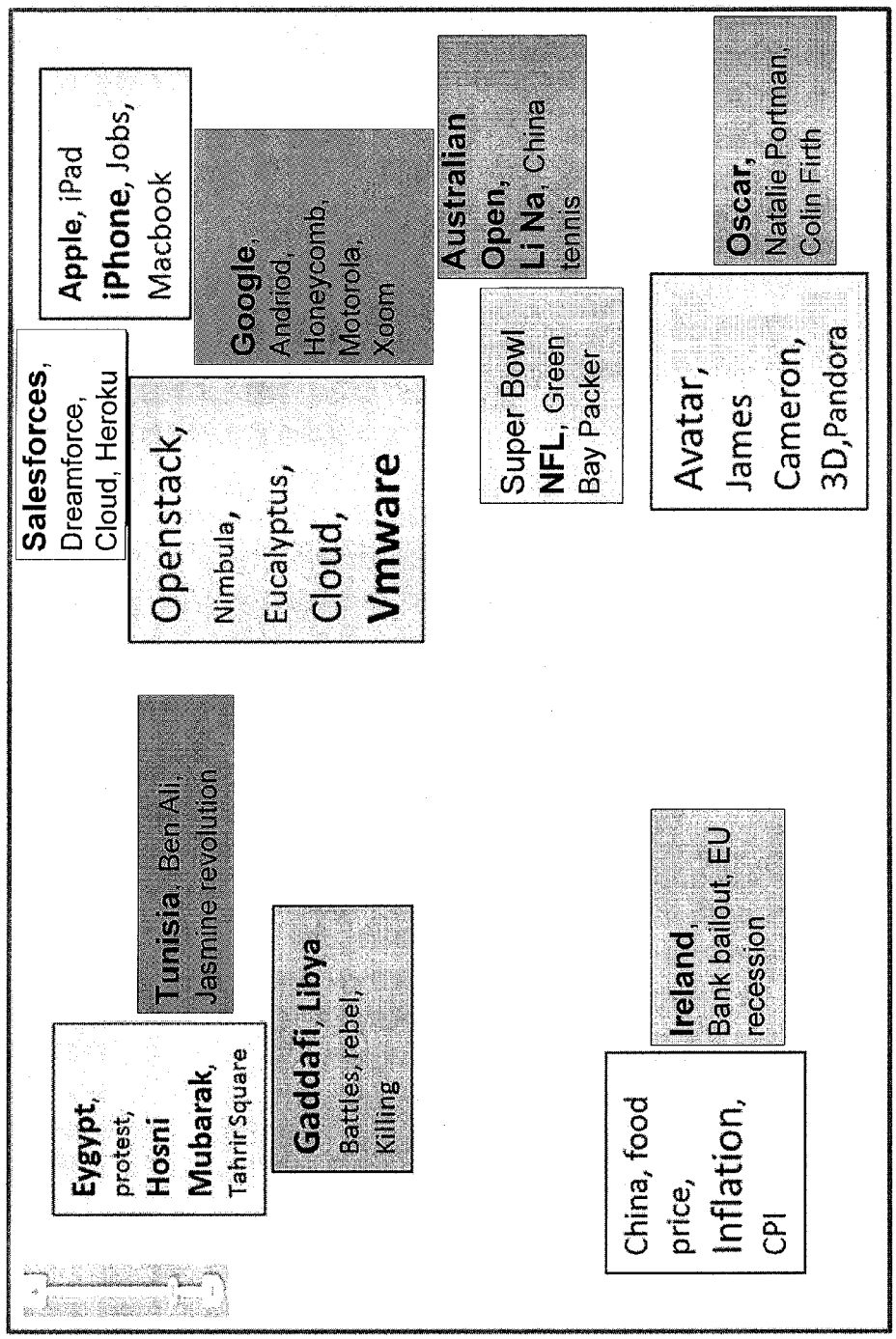
FIG. 4 illustrates an example presentation of evolution in people's personal information profiles.

In some implementations, different personal information profiles may be generated for X at different times, and animation (e.g., an animated sequence) may be used to illustrate the evolution or change of X's personal information profile over time. For example, suppose that X becomes increasingly interested in art as X learns to paint over a period of time, and collects more and more information about art history, art techniques, art appreciation, etc. This evolution in X's personal interests may be reflected in the evolution in X's personal information profiles generated over the period of time. An animated sequence may illustrate such evolution. FIG. 4 illustrates an example presentation of evolution in people's personal information profiles, where the color corresponds to the intensity or level of personal interest.

Particular embodiments may recommend specific information items (e.g., documents) to X based on X's personal information profile, as illustrated in STEP 260. In some implementations, when a specific document, A, becomes available, an adjusted vector space model may be constructed for A, and the topic to which A belongs may be determined based on A's adjust vector space model. If A belongs to a topic that X is interested in (e.g., a topic that has a relatively higher ranking score), A may be recommended to X.

Given a group of people each having a personal information profile, an information-based social network may be automatically inferred among the people in the group. A social network, in general, is a social structure made up of entities, such as individuals or organizations, that are connected by one or more types of interdependency or relationships, such as friendship, kinship, common interest, financial exchange, dislike, or relationship of beliefs, knowledge, or prestige. In more recent years, social networks have taken advantage of the Internet. For example, there are social-networking systems existing on the Internet in the form of social-networking websites. Such social-networking websites enable their members to perform various social activities.

FIG. 5 illustrates an example method for inferring an information-based social network among a group of people. Each person has a personal information profile. In some implementations, the personal information profile of a person may be automatically generated using the method illustrated in FIGS. 3 and 4. As described above, a person's information profile may include a number of topics, which may be discovered or formed by clustering the documents collected by that person. A centroid may be determined for each topic, which is the average of the documents belonging to that topic.

For each pair of individuals in the group, particular embodiments may identify topics commonly interested by both individuals, as illustrated in STEP 510. Give two specific persons, X and Y, suppose that X's personal information profile contains a number of topics and Y's personal information profile contains a number of topics. Note that the number of topics in X's personal information profile may differ from the number of topics in Y's personal information profile. For each unique pair of topics, one from X's personal information profile and one from Y's personal information profile, particular embodiments may compute the distance between the two centroids of the two topics respectively. If the distance is sufficiently close (e.g., less than a distances threshold), then particular embodiments may consider that the two topics are the same or similar such that X and Y share a common interest with respect to this pair of topics. Two people may share any number of common-interest topics.

For each pair of individuals who share one or more common-interest topics, particular embodiments may determine a common-interest correlation between the two individuals, as illustrated in STEP 520. When two individuals (e.g., X and Y) share a common-interest topic, the intensity or level of interest each person has in the topic may be the same or may differ. For example, X and Y may both be interested in art, but X is very interested in art (e.g., because X actively studies painting) while Y is only mildly interested in art. On the other hand, X and Y may both be very interested in sports. As described above, each topic in a person's information profile may have a ranking or interesting score, rScore, which indicates the intensity or level of interest the person has in that topic. Thus, given a common-interest topic shared by X and Y, there may be one interesting score of the topic for X and another interesting score of the same topic for Y. These two interesting scores, one for X and one for Y, may be similar or may be different.

Figure 6A:
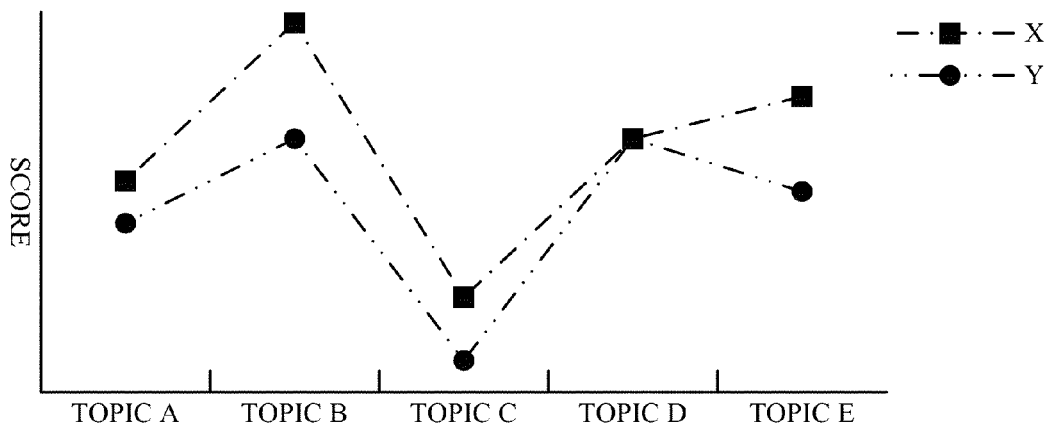
FIGS. 6A-6C illustrate several examples of common-interest correlations between two people.
Figure 6B:
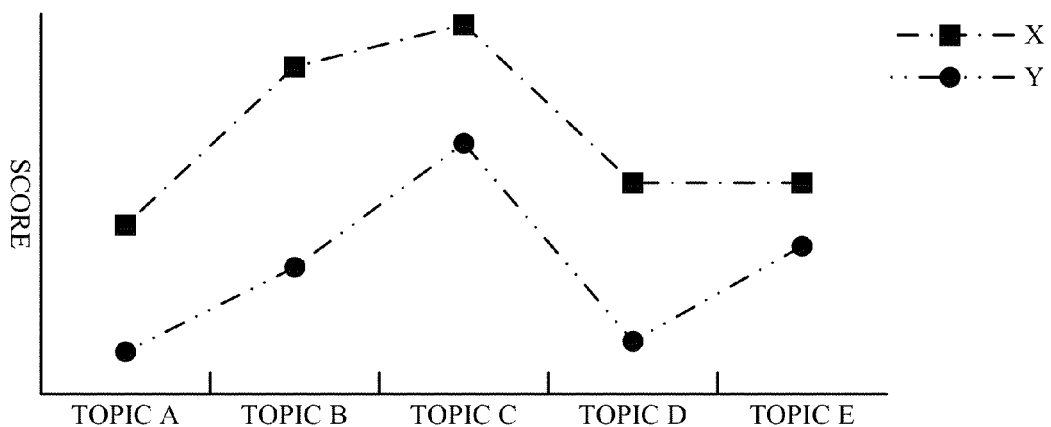
Figure 6C:
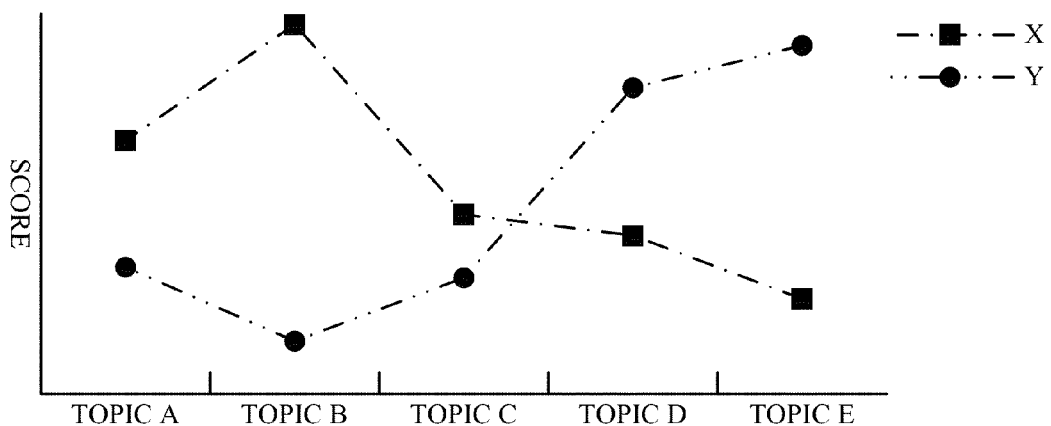

As an example, suppose that two people, X and Y, share five common-interest topics, A, B, C, D, and E. FIGS. 6A-6C illustrate several examples of different common-interest correlations between X and Y. In the example illustrated in FIG. 6A, the two interesting scores, one for X and one for Y, of each of the five common-interest topics, A, B, C, D, and E, shared by X and Y are similar. In other words, not only do X and Y share these five common-interest topics, but the levels of interest X and Y have in each topic, respectively, are similar as well. Thus, there is a relatively close correlation between X's and Y's information interests. In the example illustrated in FIG. 6B, the two interesting scores, one for X and one for Y, of each of the five common-interest topics shared by X and Y are less similar, in that X has a higher interesting score in each topic than that of Y. For example, even though both X and Y are more interested in topic B than topic A, X's interesting score for topic B is much higher than Y's interesting score for topic B. In the example illustrated in FIG. 6C, the two interesting scores, one for X and one for Y, of each of the five common-interest topics shared by X and Y are also dissimilar, even more so than the example illustrated in FIG. 6B. For example, for topic B, X has a high interesting score, while Y has a low interesting score. On the other hand, for topic D, X has a low interesting score, while Y has a high interesting score.

In some implementations, the correlation of the common-interest topics shared between two individuals (e.g., X and Y) may be measured using a correlation coefficient, $\rho_{X,Y}$, which is defined as:

$$\rho_{X,Y} = \frac{\sum_{i=1}^{i \leq n}(x_i - \bar{x})(y_i - \bar{y})}{\sqrt{\sum_{i=1}^{i \leq n}(x_i - \bar{x})^2 \sum_{i=1}^{i \leq n}(y_i - \bar{y})^2}}, \quad (6)$$

where: n is the total number of common-interest topics shared between X and Y; $\bar{x}$ is the average interesting score of the n common-interest topics for X; $x_i$ is the interesting score of common-interest topic i for X; $\bar{y}$ is the average interesting score of the n common-interest topics for Y; and $y_i$ is the interesting score of common-interest topic i for Y.

For each pair of individuals who share one or more common-interest topics, particular embodiments may determine a common-interest strength between the two individuals, as illustrated in STEP 530. Between two individuals (e.g., X and Y) who share one or more common-interest topics, the common-interest strength measures the strength of their connection (e.g., within the information-based social network). In some implementations, the strength of the connection between two individuals (e.g., X and Y) who share common-interest topics may be defined as:

$$strength_{X,Y} = \rho_{X,Y} \times \frac{\sum_{i=1}^{i \leq n}(x_i + y_i)}{\sum_{i=1}^{i \leq n}|x_i - y_i|}, \quad (7)$$

where: $\rho_{X,Y}$ is the correlation coefficient between X and Y (e.g., as defined by EQUATION (6)); n is the total number of common-interest topics shared between X and Y; $x_i$ is the interesting score of common-interest topic i for X; and $y_i$ is the interesting score of common-interest topic i for Y. Note that the second term in EQUATION (7) indicates the difference between X and Y in their levels of interest in the n common-interest topics.

Figure 7:
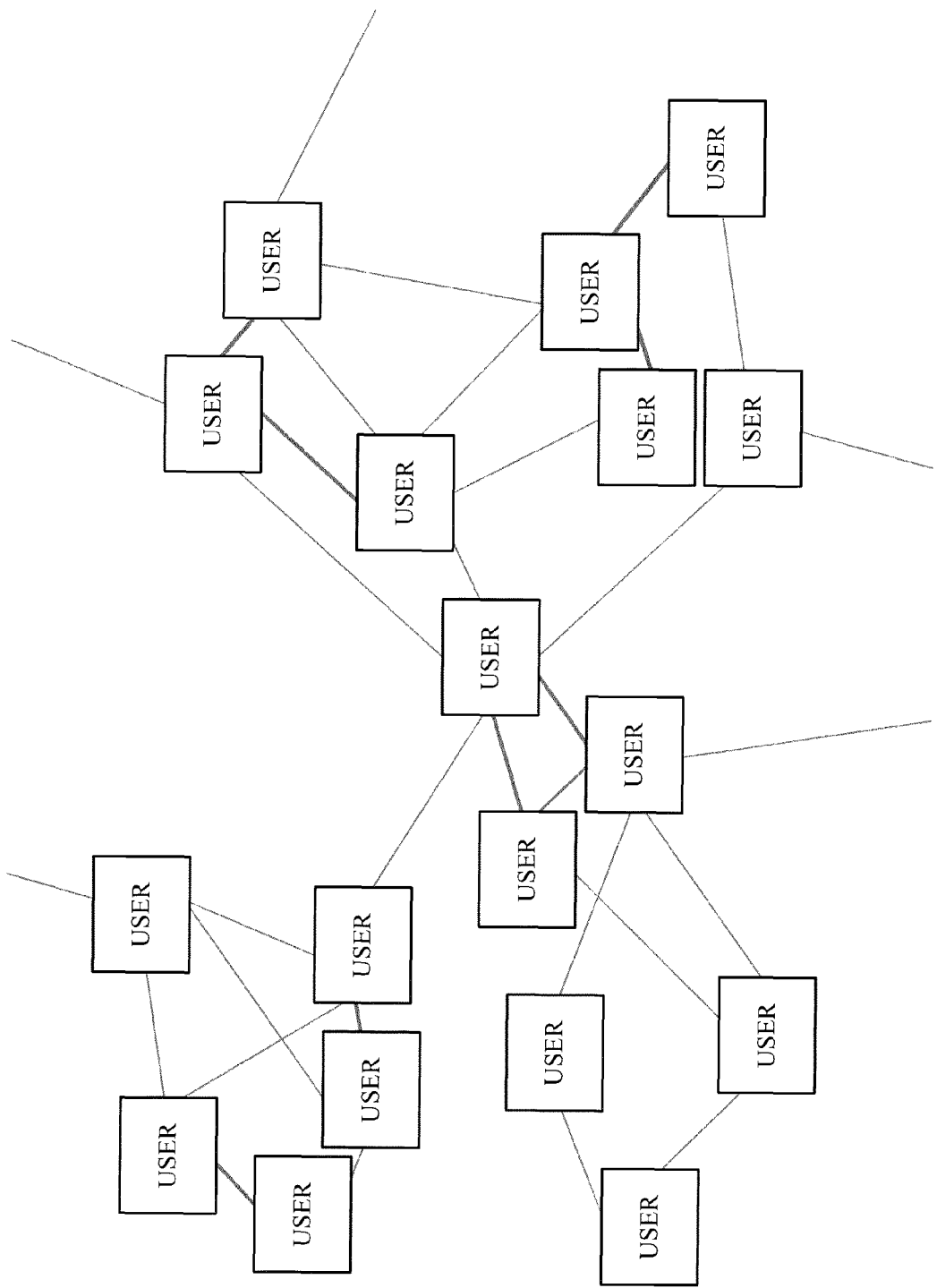
FIG. 7 illustrates an example representation of a portion of an information-based social network.

Particular embodiments may form an information-based social network among the group of people, as illustrated in STEP 540. A social connection is established between every two individuals who share one or more common-interest topics. In addition, the strength of the connection between two individuals who share one or more common-interest topics may be determined using EQUATIONS (6) and (7). FIG. 7 illustrates an example representation of a portion of an information-based social network. A line connects two people (e.g., two users) if they share at least one common-interest topic. The thickness of each line may indicate the strength of the connection between two people (e.g., the ticker the line, the stronger the connection).

Much information may be determined from analyzing such an information-based social network. For example, an average centroid of all topics may be computed for each person and visually represented (e.g., projected onto a two-dimensional map). Each person in the social network may be associated with his or her information profile. Each connection between two people may be associated with the common-interest topics shared between them.

Individuals within the social network may exchange and share information with each other, as illustrated in STEP 550. For example, recommendations may be made to a specific person of other people who share the same information interests as that person. Information may be readily, easily, and freely exchanged and shared among individuals sharing similar interests. A person may select a topic or another person to follow its progression. The individuals or topics may be ranked.

Figure 8:
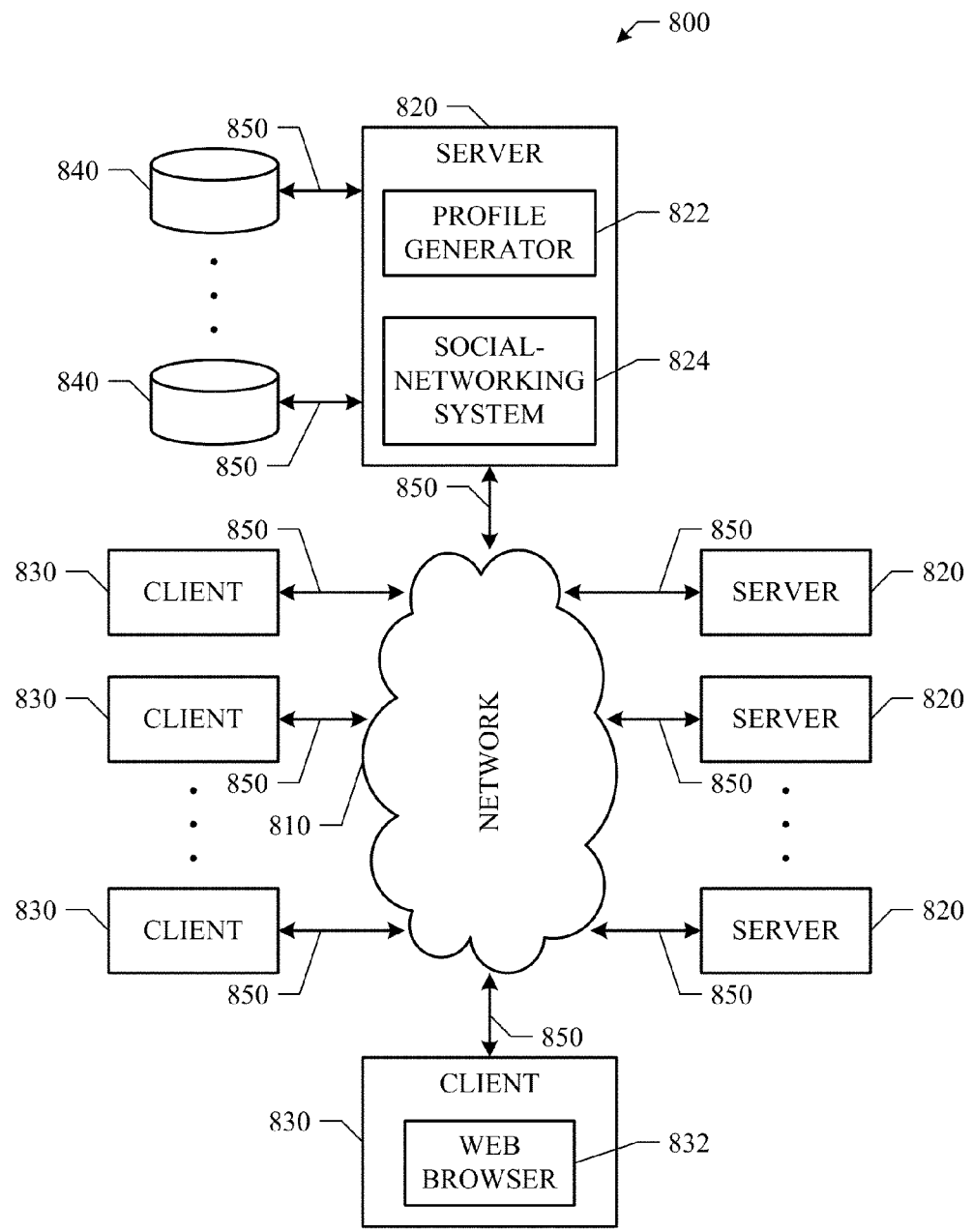
FIG. 8 illustrates an example network environment.

Particular embodiments may be implemented in a network environment. FIG. 8 illustrates an example network environment 800. Network environment 800 includes a network 810 coupling one or more servers 820 and one or more clients 830 to each other. In particular embodiments, network 810 is an intranet, an extranet, a virtual private network (VPN), a local area network (LAN), a wireless LAN (WLAN), a wide area network (WAN), a metropolitan area network (MAN), a portion of the Internet, or another network 810 or a combination of two or more such networks 810. This disclosure contemplates any suitable network 810.

One or more links 850 couple a server 820 or a client 830 to network 810. In particular embodiments, one or more links 850 each includes one or more wireline, wireless, or optical links 850. In particular embodiments, one or more links 850 each includes an intranet, an extranet, a VPN, a LAN, a WLAN, a WAN, a MAN, a portion of the Internet, or another link 850 or a combination of two or more such links 850. This disclosure contemplates any suitable links 850 coupling servers 820 and clients 830 to network 810.

In particular embodiments, each server 820 may be a unitary server or may be a distributed server spanning multiple computers or multiple datacenters. Servers 820 may be of various types, such as, for example and without limitation, web server, news server, mail server, message server, advertising server, file server, application server, exchange server, database server, or proxy server. In particular embodiments, each server 820 may include hardware, software, or embedded logic components or a combination of two or more such components for carrying out the appropriate functionalities implemented or supported by server 820. For example, a web server is generally capable of hosting websites containing web pages or particular elements of web pages. More specifically, a web server may host HTML files or other file types, or may dynamically create or constitute files upon a request, and communicate them to clients 830 in response to HTTP or other requests from clients 830. A mail server is generally capable of providing electronic mail services to various clients 830. A database server is generally capable of providing an interface for managing data stored in one or more data stores. In particular embodiments, an information profile generator 822 may be implemented on one or more servers 820 (e.g., as computer software, hardware, or a combination thereof). In addition, an information-based social-networking system 824 (e.g., implementing as a social-networking website) may be hosted on one or more servers 820.

In particular embodiments, one or more data storages 840 may be communicatively linked to one or more severs 820 via one or more links 850. In particular embodiments, data storages 840 may be used to store various types of information. In particular embodiments, the information stored in data storages 840 may be organized according to specific data structures. In particular embodiments, each data storage 840 may be a relational database. Particular embodiments may provide interfaces that enable servers 820 or clients 830 to manage, e.g., retrieve, modify, add, or delete, the information stored in data storage 840. Particular embodiments may store the information profiles automatically generated as well as information associated with the information-based social network in data storage 840.

In particular embodiments, each client 830 may be an electronic device including hardware, software, or embedded logic components or a combination of two or more such components and capable of carrying out the appropriate functionalities implemented or supported by client 830. For example and without limitation, a client 830 may be a desktop computer system, a notebook computer system, a netbook computer system, a handheld electronic device, or a mobile telephone. This disclosure contemplates any suitable clients 830. A client 830 may enable a network user at client 830 to access network 830. A client 830 may enable its user to communicate with other users at other clients 830.

A client 830 may have a web browser 832, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 830 may enter a Uniform Resource Locator (URL) or other address directing the web browser 832 to a server 820, and the web browser 832 may generate a Hyper Text Transfer Protocol (HTTP) request and communicate the HTTP request to server 820. Server 820 may accept the HTTP request and communicate to client 830 one or more Hyper Text Markup Language (HTML) files responsive to the HTTP request. Client 830 may render a web page based on the HTML files from server 820 for presentation to the user. This disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 9:
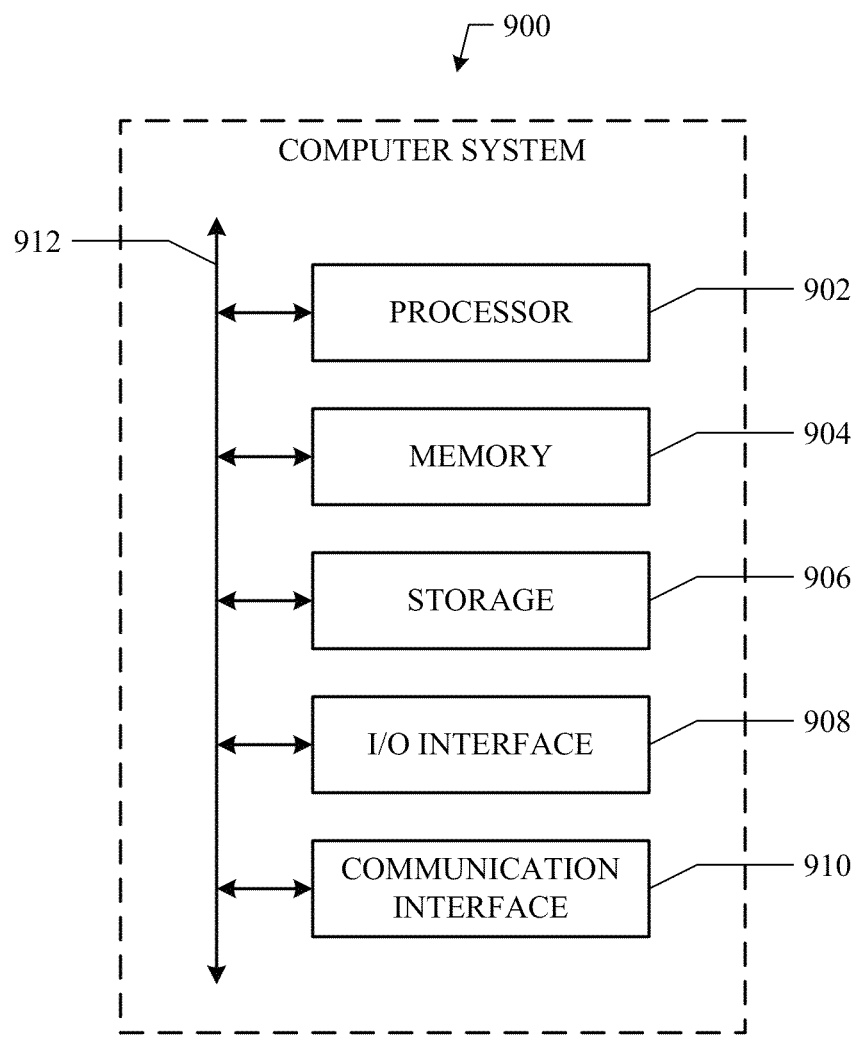
FIG. 9 illustrates an example computer system.

Particular embodiments may be implemented on one or more computer systems. FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 900 may include one or more computer systems 900; be unitary or distributed; span multiple locations; span multiple machines; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include an HDD, a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 902 (such as, for example, one or more internal registers or caches), one or more portions of memory 904, one or more portions of storage 906, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA, C, or C++. In particular embodiments, software is expressed in Hyper Text Markup Language (HTML), Extensible Markup Language (XML), or other suitable markup language.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising: by one or more computing devices,
    for each information item of a plurality of information items in a collection of information associated with a first user:
        constructing a vector space model; and
        adjusting the vector space model by an importance score of the information item, wherein the importance score indicates the level of importance the information item is to the first user;
    calculating a degree of similarity for every two information items in the collection of information;
    based on the degree of similarity calculated for every two information items in the collection of information, clustering the plurality of information items in the collection of information associated with the first user to generate a plurality of information topics using the adjusted vector space model of each information item;
    for each information topic of the plurality of information topics generated from the collection of information associated with the first user, determining an interest score, which indicates a level of interest the first user has in the information topic relative to other information topics within the plurality of information topics;
    for each information topic of the plurality of information topics, determining a second interest score, which indicates a level of interest a second user has in the information topic relative to other information topics within the plurality of information topics;
    determining that the first user shares a common interest in a plurality of common-interest information topics with the second user, wherein the determining that the interest is a shared common interest is based on the difference between the first user's level of interest in an information topic and the second user's level of interest in an information topic, as determined by the interest score and the second interest score respectively, being less than a threshold difference;
    determining a common-interest strength between the first user and the second user, wherein the common-interest strength is calculated based on:
        the number of common-interest information topics shared between the first user and the second user,
        a respective level of interest, as determined by the interest score and the second interest score, by each of the first user and the second users in the plurality of common-interest information topics, and a correlation and difference between the respective level of interest in the plurality of common-interest information topics by the first user and the second user, the common-interest strength measuring the strength of connection between the first user and the second user; and establishing a connection in a social network between the first and second users based on the common-interest strength.

2. The method of claim 1, further comprising for each information item of the plurality of information items, determining the importance score with respect to the first user.

3. The method of claim 2, wherein the importance score of each information item is determined based on one or more of:
current time;
score value set by the user;
action taken by the user with respect to the information item;
time of the information item;
content of the information item;
type of the information item;
source of the information item; or
volume of information items from the source of the information item.

4. The method of claim 1, wherein clustering the plurality of information items into the plurality of information topics comprises:
for each two information items in the plurality of information items:
determining a similarity degree between the two information items based on their respective adjusted vector space models;
if the similarity degree satisfies a similarity threshold, then grouping the two information items into a same information topic; and
if the similarity degree does not satisfy the similarity threshold, then separating the two information items into two different information topics.

5. The method of claim 1, wherein the interest score of each information topic is determined based on a time-impact factor, total number of information topics, total number of information items in the information topic, current time, and time of each information item in the information topic.

6. The method of claim 1, further comprising ranking the plurality of information topics based on the interest score of each information topic.

7. The method of claim 1, further comprising for each information topic of the plurality of information topics, determining a centroid, which is an average of all information items clustered into the information topic.

8. The method of claim 1, wherein the plurality of information items is collected by the first user.

9. The method of claim 1, further comprising:
receiving an additional information item;
determining to which one of the plurality of information topics the additional information item belongs; and
deciding whether to recommend the additional information item to the first user based on the interest score of the one information topic to which the additional information item belongs.

10. A method comprising: by one or more computing devices,
for a first user and a second user, determining that the first and second users share a common interest in a plurality of common-interest information topics based on an information profile of each user,
wherein the information profile of each user comprises a plurality of information topics of interest to the user generated from a collection of information associated with the user,
for each information topic of the plurality of information topics, determining an interest score, which indicates a level of interest the first user has in the information topic relative to other information topics within the plurality of information topics; and
for each information topic of the plurality of information topics, determining a second interest score, which indicates a level of interest the second user has in the information topic relative to other information topics within the plurality of information topics;
wherein the determining that the first and second user share a common interest in a plurality of common-interest information topics is further based on the difference between the first user's level of interest in an information topic and the second user's level of interest in an information topic, as determined by the interest score and the second interest score respectively, being less than a threshold difference;
determining a common-interest strength between the first and second users, wherein the common-interest strength is calculated based on:
a respective level of interest, as determined by the interest score and the second interest score, by each of the first user and the second user in the plurality of common-interest information topics,
a number of common-interest information topics that are shared between the first and second users, and
a correlation and a difference between the respective level of interest in the plurality of common-interest information topics by the first user and the second user,
the common-interest strength measuring a connection between the first and second users; and
establishing a connection in a social network between the first and second users based on the common-interest strength.

11. The method of claim 10, further comprising:
calculating a correlation coefficient based on:
an average interest score of the plurality of common-interest information topics from the first user,
a second average interest score of the plurality of common-interest information topics from the second user,
the interest score of each interest of the plurality of common-interest information topics from the first user, and
the second interest score of each interest of the plurality of common-interest information topics from the second user.

12. The method of claim 11, wherein the common-interest strength is also calculated using the correlation coefficient of the first user and the second user.

13. The method of claim 10, further comprising facilitating exchange and share of information items among the first user and the second user.

14. A system comprising:
a memory comprising instructions executable by one or more processors; and
the one or more processors coupled to the memory and operable to execute the instructions, the one or more processors being operable when executing the instructions to:

for each information item of a plurality of information items in a collection of information associated with a first user;
construct a vector space model; and
adjust the vector space model by an importance score of the information item, wherein the importance score indicates a level of importance the information item is to the first user;
calculate a degree of similarity for every two information items in the collection of information;
based on the degree of similarity calculated for every two information items in the collection of information, cluster the plurality of information items in the collection of information associated with the first user to generate a plurality of information topics using the adjusted vector space model of each information item; and
for each information topic of the plurality of information topics generated from the collection of information associated with the first user, determine an interest score, which indicates a level of interest the first user has in the information topic relative to other information topics within the plurality of information topics;
for each information topic of the plurality of information topics, determining a second interest score, which indicates a level of interest a second user has in the information topic relative to other information topics within the plurality of information topics;
determining that the first user shares a common interest in a plurality of common-interest information topics with the second user, wherein the determining that the interest is a shared common interest is based on the difference between the first user's level of interest in an information topic and the second user's level of interest in an information topic, as determined by the interest score and the second interest score respectively, being less than a threshold difference;
determining a common-interest strength between the first user and the second user, wherein the common-interest strength is calculated based on:
the number of common-interest information topics shared between the first user and the second user,
a respective level of interest, as determined by the interest score and the second interest score, by each of the first and the second user in the plurality of common-interest information topics, and
a correlation and difference between the respective level of interest in the plurality of common-interest information topics by the first user and the second user,
the common-interest strength measuring the strength of connection between the first user and the second user; and
establishing a connection in a social network between the first and second users based on the common-interest strength.

15. The system of claim 14, wherein the one or more processors are further operable when executing the instructions to for each information item of the plurality of information items, determine the importance score with respect to the first user.

16. The system of claim 15, wherein the importance score of each information item is determined based on one or more of:
current time;
score value set by the user;
action taken by the user with respect to the information item;
time of the information item;
content of the information item;
type of the information item;
source of the information item; or
volume of information items from the source of the information item.

17. The system of claim 14, wherein clustering the plurality of information items into the plurality of information topics comprises:
for each two information items in the plurality of information items:
determine a similarity degree between the two information items based on their respective adjusted vector space models;
if the similarity degree satisfies a similarity threshold, then grouping the two information items into a same information topic; and
if the similarity degree does not satisfy the similarity threshold, then separating the two information items into two different information topics.

18. The system of claim 14, wherein the interest score of each information topic is determined based on a time-impact factor, total number of information topics, total number of information items in the information topic, current time, and time of each information item in the information topic.

19. The system of claim 14, wherein the one or more processors are further operable when executing the instructions to rank the plurality of information topics based on the interest score of each information topic.

20. The system of claim 14, wherein the one or more processors are further operable when executing the instructions to for each information topic of the plurality of information topics, determining a centroid, which is an average of all information items clustered into the information topic.

21. The system of claim 14, wherein the plurality of information items is collected by the first user.

22. The system of claim 14, wherein the one or more processors are further operable when executing the instructions to:
receive an additional information item;
determine to which one of the plurality of information topics the additional information item belongs; and
decide whether to recommend the additional information item to the first user based on the interest score of the one information topic to which the additional information item belongs.

23. A system comprising:
a memory comprising instructions executable by one or more processors; and
the one or more processors coupled to the memory and operable to execute the instructions, the one or more processors being operable when executing the instructions to:
for a first user and a second user, determine that the first and second users share a common interest in a plurality of common-interest information topics based on an information profile of each user,
wherein the information profile of each user comprises a plurality of information topics of interest to the user generated from a collection of information associated with the user,
for each information topic of the plurality of information topics, determine an interest score, which indicates a level of interest the first user has in the information topic relative to other information topics within the plurality of information topics; and for each information topic of the plurality of information topics, determine a second interest score, which indicates a level of interest the second user has in the information topic relative to other information topics within the plurality of information topics;

wherein the determining that the first and second user share a common interest in a plurality of common-interest information topics is based on the difference between the first user's level of interest in an information topic and the second user's level of interest in an information topic, as determined by the interest score and the second interest score respectively, being less than a threshold difference;

determine a common-interest strength between the first and second users, wherein the common-interest strength is calculated based on:
  a respective level of interest, as determined by the interest score and the second interest score, by each of the first user and the second user in the plurality of common-interest information topics,
  a number of common-interest information topics that are shared between the first and second users, and
  a correlation and a difference between the respective level of interest in the plurality of common-interest information topics by the first user and the second user, the common-interest strength measuring a connection between the first and second users; and establishing a connection in a social network between the first and second users based on the common-interest strength.

24. The system of claim 23, wherein the one or more processors are further operable when executing instructions to calculate a correlation coefficient based on:
  an average interest score of the plurality of common-interest information topics from the first user,
  a second average interest score of the plurality of common-interest information topics from the second user,
  the interest score of each of the plurality of common-interest information topics from the first user, and
  the second interest score of each of the plurality of common-interest information topics from the second user.

25. The system of claim 24, wherein the one or more processors are further operable when executing the instructions to calculate the common-interest strength using the correlation coefficient of the first user and the second user.

26. The system of claim 23, wherein the one or more processors are further operable when executing the instructions to facilitate exchange and share of information items among the first user and the second user.

27. One or more computer-readable non-transitory storage media embodying software operable when executed by one or more computer systems to:
  for each information item of a plurality of information items in a collection of information associated with a first user:
    construct a vector space model; and
    adjust the vector space model by an importance score of the information item, wherein the importance score indicates the level of importance the information item is to the first user;
  calculate a degree of similarity for every two information items in the collection of information;
  based on the degree of similarity calculated for every two information items in the collection of information, cluster the plurality of information items in the collection of information associated with the first user to generate a plurality of information topics using the adjusted vector space model of each information item; and for each information topic of the plurality of information topics generated from the collection of information associated with the first user, determine an interest score, which indicates a level of interest the first user has in the information topic relative to other information topics within the plurality of information topics;

for each information topic of the plurality of information topics, determine a second interest score, which indicates a level of interest a second user has in the information topic relative to other information topics within the plurality of information topics;

determining that the first user shares a common interest in a plurality of common-interest information topics with the second user, wherein the determining that the interest is a shared common interest is based on the difference between the first user's level of interest in an information topic and the second user's level of interest in an information topic, as determined by the interest score and the second interest score respectively, being less than a threshold difference;

determine a common-interest strength between the first user and the second user, wherein the common-interest strength is calculated based on:
    the number of common-interest information topics shared between the first user and the second user,
    a respective level of interest, as determined by the interest score and the second interest score, by each of the first user and the second users in the plurality of common-interest information topics, and
    a correlation and difference between the respective level of interest in the plurality of common-interest information topics by the first user and the second user, the common-interest strength measuring the strength of connection between the first user and the second user; and establishing a connection in a social network between the first and second users based on the common-interest strength.

28. The media of claim 27, wherein the software is further operable when executed by the one or more computer systems to for each information item of the plurality of information items, determining the importance score with respect to the first user.

29. The media of claim 28, wherein the importance score of each information item is determined based on one or more of:
  current time;
  score value set by the user;
  action taken by the user with respect to the information item;
  time of the information item;
  content of the information item;
  type of the information item;
  source of the information item; or
  volume of information items from the source of the information item.

30. The media of claim 27, wherein clustering the plurality of information items into the plurality of information topics comprises:
  for each two information items in the plurality of information items:
    determining a similarity degree between the two information items based on their respective adjusted vector space models;

if the similarity degree satisfies a similarity threshold, then grouping the two information items into a same information topic; and if the similarity degree does not satisfy the similarity threshold, then separating the two information items into two different information topics.

31. The media of claim 27, wherein the interest score of each information topic is determined based on a time-impact factor, total number of information topics, total number of information items in the information topic, current time, and time of each information item in the information topic.

32. The media of claim 27, wherein the software is further operable when executed by the one or more computer systems to rank the plurality of information topics based on the interest score of each information topic.

33. The media of claim 27, wherein the software is further operable when executed by the one or more computer systems to for each information topic of the plurality of information topics, determine a centroid, which is an average of all information items clustered into the information topic.

34. The media of claim 27, wherein the plurality of information items is collected by the first user.

35. The media of claim 27, wherein the software is further operable when executed by the one or more computer systems to:

receive an additional information item;

determine to which one of the plurality of information topics the additional information item belongs; and decide whether to recommend the additional information item to the first user based on the interest score of the one information topic to which the additional information item belongs.

36. One or more computer-readable non-transitory storage media embodying software operable when executed by the one or more computer systems to:

for a first user and a second user, determine that the first and second users share a common interest in a plurality of common-interest information topics based on an information profile of each user, wherein the information profile of each user comprises a plurality of information topics of interest to the user generated from a collection of information associated with the user, for each information topic of the plurality of information topics, determine an interest score, which indicates a level of interest the first user has in the information topic relative to other information topics within the plurality of information topics; and for each information topic of the plurality of information topics, determine a second interest score, which indicates a level of interest the second user has in the information topic relative to other information topics within the plurality of information topics;

wherein the determining that the first and second user share a common interest in a plurality of common-interest information topics is based on the difference between the first user's level of interest in an information topic and the second user's level of interest in an information topic, as determined by the interest score and the second interest score respectively, being less than a threshold difference;

determine a common-interest strength between the first and second users, wherein the common-interest strength is calculated based on:

a respective level of interest, as determined by the interest score and the second interest score, by each of the first user and the second user in the plurality of common-interest information topics, a number of common-interest information topics that are shared between the first and second users, and a correlation and a difference between the respective level of interest in the plurality of common-interest information topics by the first user and the second user, the common-interest strength measuring a connection between the first and second users; and establish a connection in a social network between the first and second users based on the common-interest strength.

37. The media of claim 36, wherein the software is further operable when executed by the one or more computer systems to calculate a correlation coefficient based on:

an average interest score of the plurality of common-interest information topics from the first user, a second average interest score of the plurality of common-interest information topics from the second user, the interest score of each of the plurality of common-interest information topics from the first user, and the second interest score of each of the plurality of common-interest information topics from the second user.

38. The media of claim 37, wherein the common-interest strength is also calculated using the correlation coefficient of the first user and the second user.

39. The media of claim 36, wherein the software is further operable when executed by the one or more computer systems to facilitate exchange and share of information items among first user and the second user.

40. A system comprising:

for each information item or a plurality of information items in a collection of information associated with a first user:

means for constructing a vector space model; and means for adjusting the vector space model by an importance score of the information item, wherein the importance score indicates the level of importance the information item is to the first user;

means for calculating a degree of similarity for every two information items in the collection of information;

based on the degree of similarity calculated for every two information items in the collection of information, means for clustering the plurality of information items in the collection of information associated with the first user to generate a plurality of information topics using the adjusted vector space model of each information item;

for each information topic of the plurality of information topics generated from the collection of information associated with the first user, means for determining an interest score, which indicates a level of interest the first user has in the information topic relative to other information topics within the plurality of information topics;

for each information topic of the plurality of information topics, means for determining a second interest score, which indicates a level of interest a second user has in the information topic relative to other information topics within the plurality of information topics;

means for determining that the first user shares a common interest in a plurality of common-interest information topics with the second user, wherein the determining that the interest is a shared common interest is based on the difference between the first user's level of interest in an information topic and the second user's level of interest in an information topic, as determined by the interest score and the second interest score respectively, being less than a threshold difference;
means for determining a common-interest strength between the first user and the second user, wherein the common-interest strength is calculated based on:
　　the number of common-interest information topics shared between the first user and the second user,
　　a respective level of interest, as determined by the interest score and the second interest score, by each of the first user and the second users in the plurality of common-interest information topics, and
　　a correlation and difference between the respective level of interest in the plurality of common-interest information topics by the first user and the second user,
the common-interest strength measuring the strength of connection between the first user and the second user; and
means for establishing a connection in a social network between the first and second users based on the common-interest strength.

41. A System comprising:
for a first user and a second user, means for determining that the first and second users share a common interest in a plurality of common-interest information topics based on an information profile of each user,
wherein the information profile of each user comprises a plurality of information topics of interest to the user generated from a collection of information associated with the user,
for each information topic of the plurality of information topics, means for determining an interest score, which indicates a level of interest the first user has in the information topic relative to other information topics within the plurality of information topics; and
for each information topic of the plurality of information topics, means for determining a second interest score, which indicates a level of interest the second user has in the information topic relative to other information topics within the plurality of information topics;
wherein the determining that the first and second user share a common interest in a plurality of common-interest information topics is based on the difference between the first user's level of interest in an information topic and the second user's level of interest in an information topic, as determined by the interest score and the second interest score respectively, being less than a threshold difference;
means for determining a common-interest strength between the first and second users, wherein the common-interest strength is calculated based on:
　　a respective level of interest, as determined by the interest score and the second interest score, by each of the first user and the second user in the plurality of common-interest information topics,
　　a number of common-interest information topics that are shared between the first and second users, and
　　a correlation and difference between the respective level of interest in the plurality of common-interest information topics by the first user and the second user,
the common-interest strength measuring a connection between the first and second users; and
means for establishing a connection in a social network between the first and second users based on the common-interest strength.

\* \* \* \* \*